US008117304B2

(12) United States Patent
Grigsby et al.

(10) Patent No.: US 8,117,304 B2
(45) Date of Patent: Feb. 14, 2012

(54) PROCESSING EVENT NOTIFICATIONS WITH AN EVENT SINK

(75) Inventors: Travis M. Grigsby, Austin, TX (US); Ruthie D. Lyle, Durham, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 11/924,583

(22) Filed: Oct. 25, 2007

(65) Prior Publication Data

US 2009/0113452 A1 Apr. 30, 2009

(51) Int. Cl.
*G06F 15/16* (2006.01)
(52) U.S. Cl. ........................................ 709/224; 709/223
(58) Field of Classification Search .................. 709/223, 709/224
See application file for complete search history.

(56) References Cited

U.S. PATENT DOCUMENTS

| 6,298,378 | B1 | 10/2001 | Angal et al. |
| 6,707,890 | B1 | 3/2004 | Gao et al. |
| 7,188,138 | B1 * | 3/2007 | Schneider ..................... 709/203 |
| 7,937,714 | B2 | 5/2011 | Grigsby et al. |
| 2002/0087643 | A1 * | 7/2002 | Parsons et al. ................ 709/206 |
| 2003/0144849 | A1 | 7/2003 | Kakivaya et al. |
| 2005/0203949 | A1 | 9/2005 | Cabrera et al. |
| 2006/0031572 | A1 | 2/2006 | Feuerstein et al. |
| 2006/0139312 | A1 * | 6/2006 | Sinclair et al. ................ 345/156 |
| 2006/0225053 | A1 | 10/2006 | Lakshman et al. |
| 2007/0198946 | A1 * | 8/2007 | Viji et al. ...................... 715/779 |
| 2008/0155563 | A1 | 6/2008 | Nakamura |
| 2008/0229334 | A1 | 9/2008 | Graham et al. |
| 2009/0113451 | A1 * | 4/2009 | Grigsby et al. ............... 719/318 |
| 2011/0239228 | A1 | 9/2011 | Grigsby et al. |

OTHER PUBLICATIONS

Emergency Notification Through Instant Messaging, Information Technology Services, Ping Msstate.edu, Mississippi State University, Jan./Feb. 2007, 4 pages, <http://www.its.msstate.edu/Information/Workshops/pdfs/ping/janfeb07.pdf>.
Travis M. Grigsby et al., U.S. Appl. No. 11/924,575, filed Oct. 25, 2007, Notice of Allowance, Dec. 28, 2010, 6 pages.

* cited by examiner

*Primary Examiner* — Wing F. Chan
*Assistant Examiner* — Andrew Woo
(74) *Attorney, Agent, or Firm* — Marcia L. Doubet

(57) ABSTRACT

Applications generating events, and system facilities generating events, send notifications of the events to a system event sink. The event sink is preferably associated with an operating system, and provides an application programming interface for registering listeners. (In one alternative approach, the event sink operates as a centrally-accessible or network-accessible entity, where it may concurrently interact with more than one client.) Upon receiving a notification of an event, the event sink forwards the notification to any registered listeners. Optionally, filters may be used to specify criteria to be met before a notification is forwarded to the listener. An event does not rely on a particular application for displaying the event to an end user. As one example, notification of a newly-arrived e-mail message might be presented in a chat window of an instant messaging client.

10 Claims, 10 Drawing Sheets

PROCESSING EVENT NOTIFICATIONS WITH AN EVENT SINK

BACKGROUND OF THE INVENTION

The present invention relates to computer programming, and deals more particularly with techniques for processing event notifications with an event sink, whereby event producers send event notifications to the event sink, which then routes those notifications to listeners.

Instant messaging ("IM") systems are a popular communications mechanism for many people, and provide for instant, real-time communication between users who are connected to the IM system through an on-line or electronic networking environment such as the Internet, World Wide Web (hereinafter, "Web"), or corporate internal intranets. Examples of instant messaging systems include Yahoo!®, Messenger, AOL Instant Messenger$^{SM}$, and IBM® Lotus® Sametime®. ("Yahoo!" is a registered trademark of Yahoo! Inc. in the United States, other countries, or both; "AOL Instant Messenger" is a service mark of America Online, Inc. in the United States, other countries, or both; and "IBM", "Lotus", and "Sametime" are registered trademarks of International Business Machines Corporation in the United States, other countries, or both.) An IM client of a person creating a message sends that message for rendering at an IM client of the message recipient; or, if more than two people are participating in an IM chat session, the message may be sent to the IM client of multiple message recipients.

BRIEF SUMMARY OF THE INVENTION

The present invention is directed to processing event notifications. In one aspect, this comprises: receiving, at an event sink from each of at least one event notification producer, at least one event notification, wherein each event notification producer comprises one of an operating system of a computer on which the event notification producer executes or an executing application program; and sending at least one of the received event notifications from the event sink to at least one registered listener that registered its interest in receiving and rendering that event notification with the event sink and that is an executing application program distinct from the producer of at least one of the sent at least one event notifications.

In another aspect, the present invention comprises: receiving, at an executing application that registered interest in receiving at least one event notification, the event notification, wherein the event notification pertains to a message or a status of a different application or of an operating system and was produced by the different application or the operating system responsive to the message or the status and sent by the producer to an event sink with which the receiving application registered the interest and from which the event notification is sent to the receiving application; and rendering the received event notification by the receiving application instead of, or in addition to, rendering the message or the status by a rendering mechanism of the producer of the received event notification.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Embodiments of the present invention are directed toward providing event notifications to end users in novel ways. Using techniques disclosed herein, an incoming message does not rely on the application receiving the message to display (or otherwise render) the message to an end user. Instead of using the receiving application's conventional rendering mechanism, a different application renders a notification of the message. An embodiment of the present invention may render notifications of system events in a similar manner that is, by rendering the notifications using an application that is not necessarily related to the system events. (It should be noted that while discussions herein are primarily in terms of visually rendering notification messages, this is by way of illustration and not of limitation.)

Instant messaging systems are often used for communicating among friends, and are also becoming integral business tools that enable team members or other business associates to communicate more efficiently and effectively for example, as they collaborate on a project. A messaging application end user (referred to herein as a "user" for ease of reference) will often "ping" or send a message to a co-worker instead of calling the co-worker by telephone. The few seconds of time saved in this manner allows the user to become more productive, as well as enabling him to multitask while waiting for a response.

This existing approach has drawbacks, however. As an example, it may happen that a computer system notification is generated, or a notification from another application arrives at the sending user's computing device, while the user is awaiting a response to a previously-sent instant message. If the user is currently focused on his IM chat window and the notification is delivered into a separate window, the user might completely overlook the arrival of the notification. In addition or instead, if the arriving notification is displayed in a window that receives the focus because of displaying the notification, it may be annoying or inconvenient for the focus to now be taken away from an application with which the user was working at the time (such as his IM chat window).

Embodiments of the present invention, by contrast, deliver notification messages within the window of a client application registered for receiving such notifications. For example, a user might register his IM client for receiving notifications, in which case the notification message may be rendered in a window of the IM client application (or, similarly, in a window of another application that registers to receive notifications), thereby allowing that window to maintain the focus. The approach disclosed herein also lessens the chance that the user will miss new notification messages because those notifications may now be presented in the same window where the user is currently working.

The notification messages may received by an application operable on the user's computing device, such as an e-mail application that receives an inbound e-mail message. As another alternative, notification messages may be generated by the computer system itself, such as notification messages generated by the operating system of the user's computing device. Notably, the window where a notification message is rendered when using techniques disclosed herein does not need to be related to the application to which the notification message pertains, or to the system component that generates the notification.

Referring by way of example to a scenario where a user is interacting with a sudoku puzzle application and a new e-mail message arrives for this user, prior art systems typically pop up a modal dialog window for displaying the new e-mail message. This may cause the user to lose all of his work on the sudoku puzzle as the focus switches to the new modal dialog window. As another example, suppose the user is interacting with a full-screen application that provides a particular "look and feel". It may be distracting to the user when, according to prior art techniques, the e-mail message is displayed in a new window that does not share that same look and feel. An embodiment of the present invention enables the user to avoid these undesirable situations.

Figure 1:
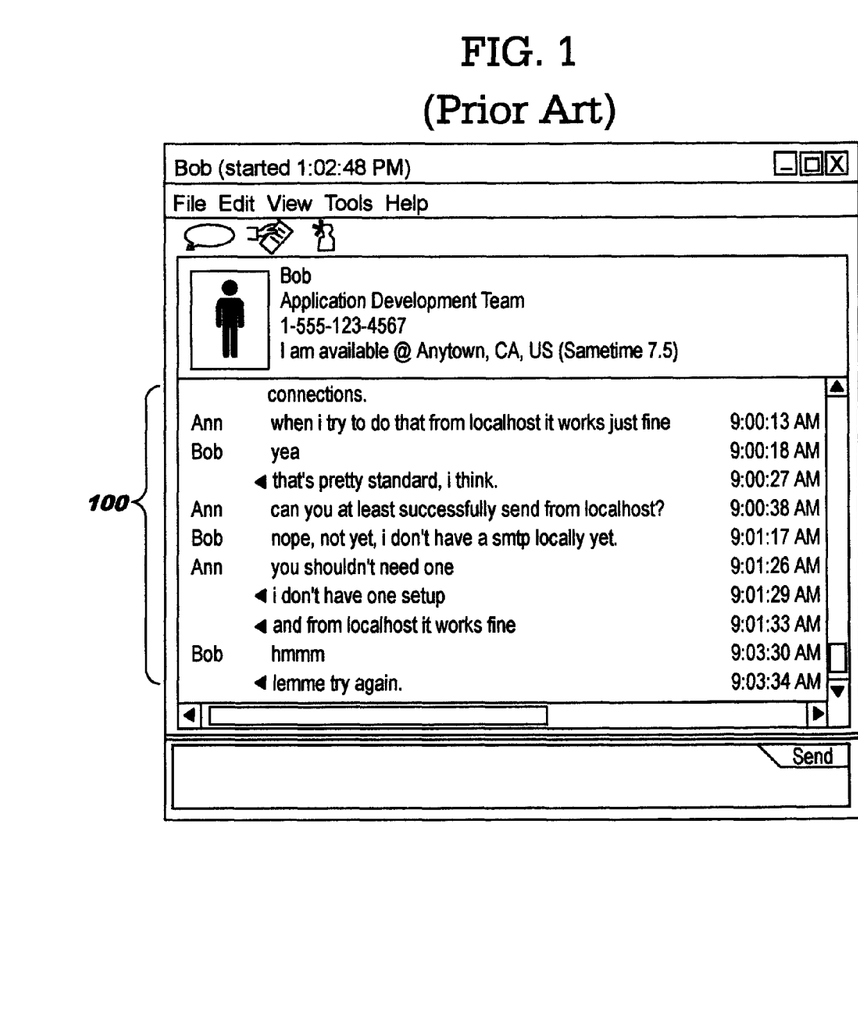
FIG. 1 provides a sample user interface display of an IM client, according to the prior art.

FIG. 1 illustrates a sample prior art IM chat session between a first user "Ann" and a second user "Bob". Messages exchanged between Ann and Bob are shown as sequentially-ordered lines of text (i.e., according to a temporal order associated with each chat message) in the chat window 100, and these messages typically scroll upward automatically as each new message arrives. A chat history file is commonly maintained as well, where the exchanged messages are persistently recorded.

Figure 2:
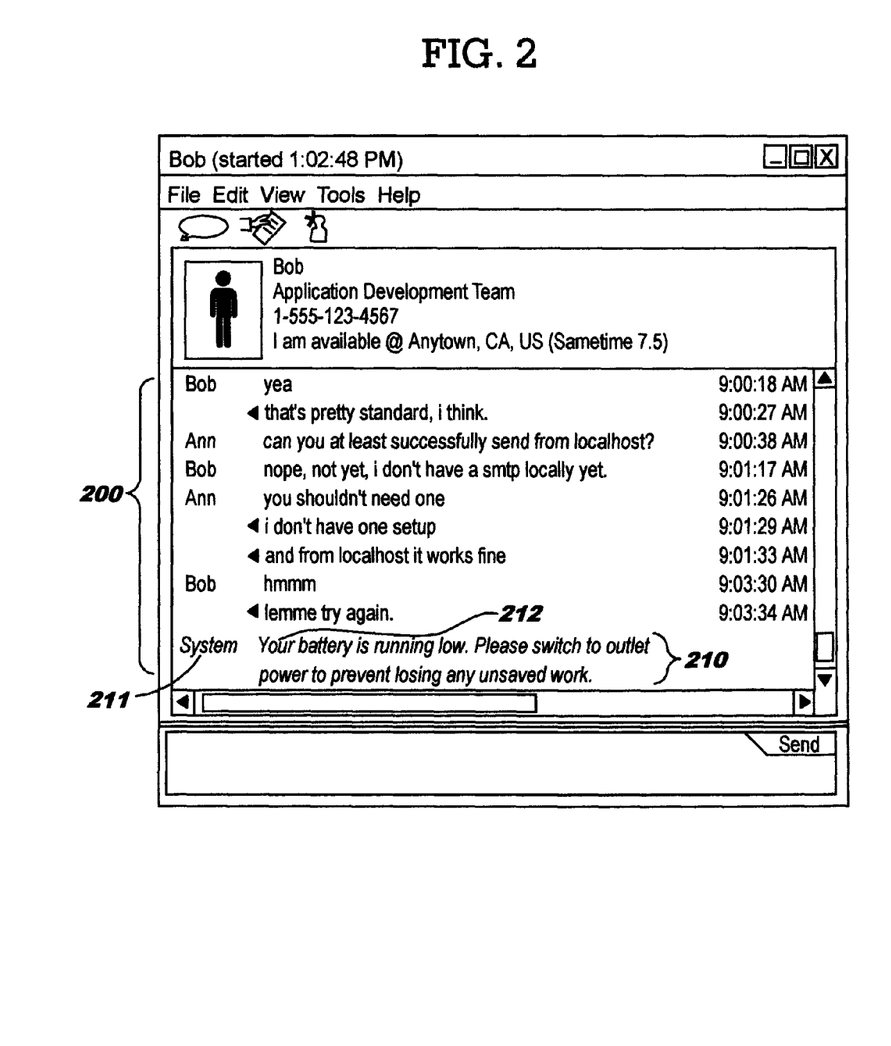
FIGS. 2 and 3 illustrate one manner of providing notification of a system event and notification of a newly-arriving e-mail message, respectively, communicating that notification by rendering a message in a user's IM chat window, according to an embodiment of the present invention.

Suppose that an operating system alert or other type of system message (referred to herein as a "system message" for ease of reference) arrives while Ann and Bob are exchanging instant messages. When using an embodiment of the present invention, the user's IM client can be registered as a listener for such system messages, and upon being notified of a new system message, the IM client displays that notification to the user in the chat window. FIG. 2 illustrates one manner in which this newly-arriving system message may be depicted in the user's chat window 200. See reference number 210, where a sample notification message is presented. As illustrated therein, an identifier "System" 211 is displayed as the source of the notification, and a text message 212 provides details of the notification event.

Figure 3:
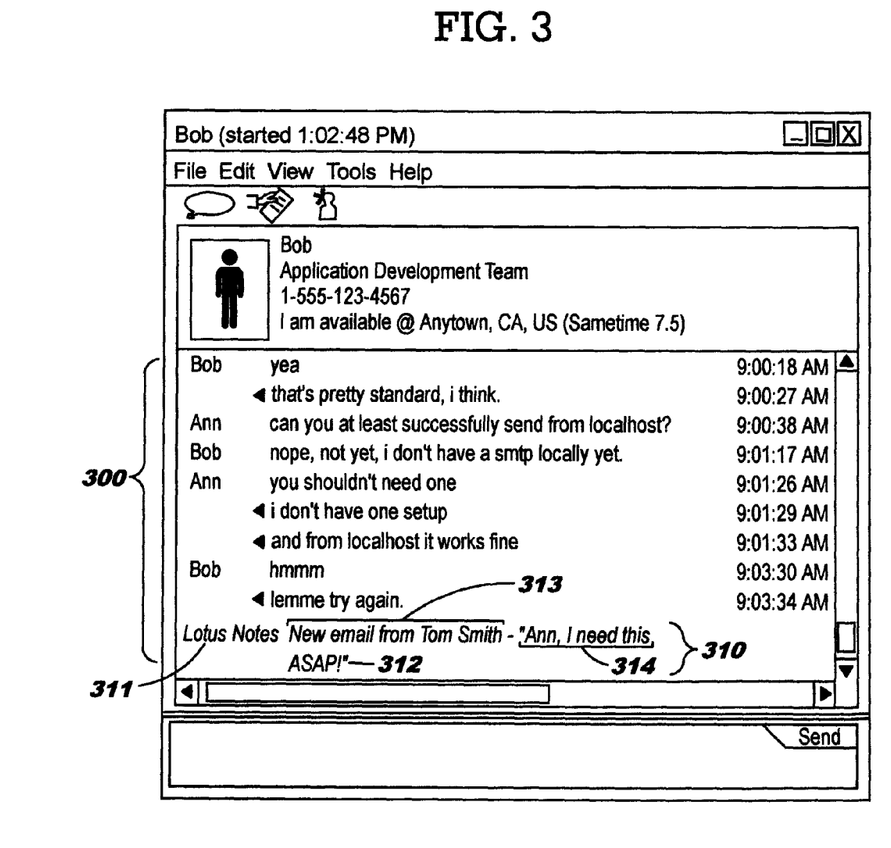

In another scenario, suppose that a new e-mail message arrives for Ann while she and Bob are exchanging instant messages. When using an embodiment of the present invention, Ann's IM client can be registered as a listener for incoming e-mail messages, and upon being notified of a newly-arrived e-mail message, the IM client displays that notification to Ann in the chat window. FIG. 3 illustrates one manner in which information pertaining to this newly-arriving e-mail message might be depicted in chat window 300. See reference number 310, where a sample notification message pertaining to the e-mail message is presented. This sample notification message displays an identifier "Lotus Notes" 311 as the source of the notification (representing, in this example, the e-mail application operable on Ann's computing device), as well as a text message 312 comprising an identification of the sender of the e-mail message ("New e-mail from Tom Smith", in this example; see 313) and a short summary of the e-mail message ("Ann, I need this ASAP!", in this example; see 314).

As can be seen from the examples in FIGS. 2 and 3, the user is able to receive notifications in a convenient manner that does not cause the currently-displayed IM chat window to lose the focus. It should be noted that embodiments of the present invention are not limited to displaying the arriving notifications in a chat window, and thus the references herein to rendering message notifications in a chat window are by way of illustration and not of limitation.

According to an embodiment of the present invention, a system event sink receives notifications of events and one or more applications register as listeners for events of interest to that application. In one approach, the system event sink operates as an operating system utility or feature in an end user computing device. (The term "end user" is used by way of illustration and not of limitation.)

Figure 4:
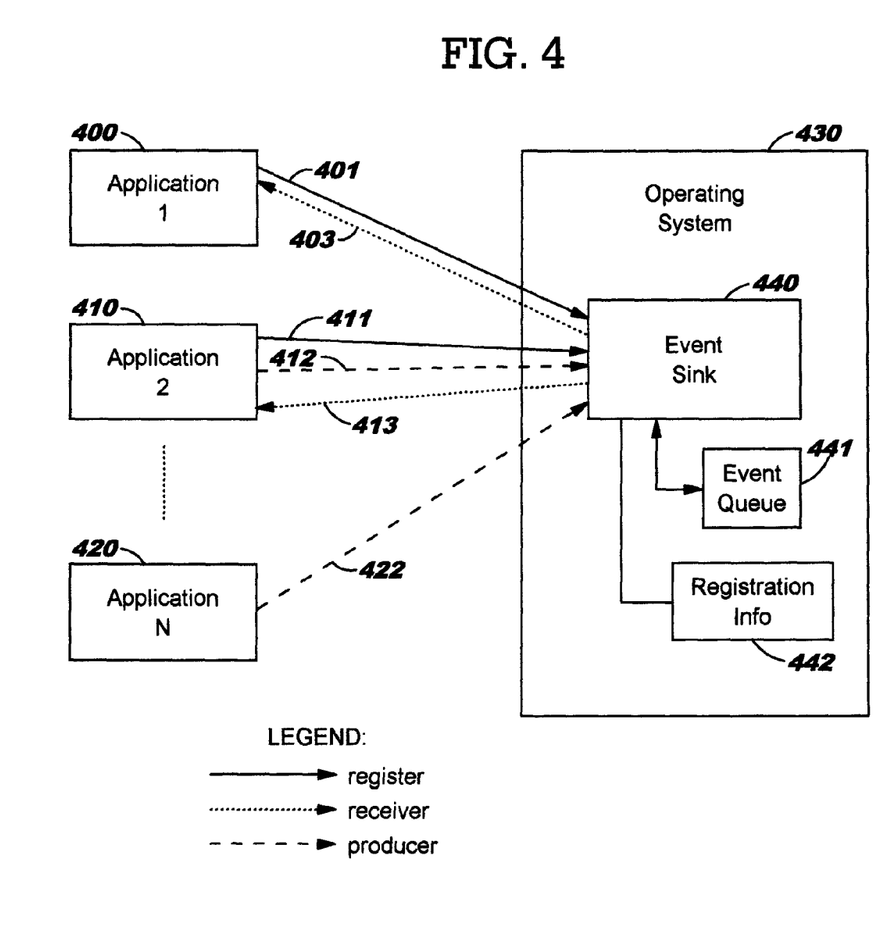
FIG. 4 depicts components that may be present in a sample configuration of an embodiment of the present invention.

See FIG. 4, depicting components that may be present in a sample configuration of an embodiment of the present invention. As shown therein, some number of applications 400, 410, . . . 420 are operable on the computing device, in addition to an operating system 430. The operating system 430 is depicted as containing the event sink 440, by way of illustration. The application programs (referred to equivalently herein as "applications") communicate with the event sink 440 using an application programming interface ("API") provided for such communications. Applications may be producers of notification messages and/or consumers (i.e., receivers) of notification messages, where the consumers are applications that register for receiving event notifications. Application 1 400 and application 2 410 are shown, in this sample configuration, as registering their interest in particular events with the event sink 440. See registration message flows 401, 411. Application 2 410 and Application N 420 are shown, in this sample configuration, as event producers. Message flows 412, 422 represent notification messages sent from each of these applications to the event sink 440. For example, Application N 420 might be an e-mail application executing on this computing device, and might send message 422 responsive to receiving an inbound e-mail message for delivery to the user of this computing device. Application 1 400 and Application 2 410 are shown, in this sample configuration, as event receivers. See message flows 403, 413, which correspond to the event sink 440 sending notifications to registered listeners 400, 410.

FIG. 4 also illustrates information 441, 442 that is accessible to the event sink 430. In this sample configuration, the event sink uses an event queue 441 and registration information 442 that pertains to the registered listeners (as will be discussed in more detail). Alternatively, event sink 440 might access event queue 441 and/or registration information 442 from persistent storage (such as a database).

Techniques for registering listeners and forwarding notifications to registered listeners are known in the art. To the best of the present inventors' knowledge and belief, using such techniques as disclosed herein is not known. Furthermore, embodiments of the present invention are not limited to registration using dynamic message flows. Alternatives include statically creating a list or other data structure that identifies each interested application and consulting this data structure for forwarding event notifications to interested applications, and descriptions provided herein include such alternatives when referring to "registering" or "registered" listeners.

An embodiment of the present invention may use a "push" model; alternatively, a "pull" model may be used. In a push model, when a message arrives from an event producer, a notification is automatically sent to each registered listener that registered as a listener for that message. In a pull model, a registered listener periodically checks with the event sink to see if any messages have arrived for which that listener is interested. In either model, an event producer is not required to know which listeners have registered their interest in that event.

As stated earlier, an API is provided for communicating with the event sink. This API is preferably used for registering applications as listeners for events. Parameters used for the registration may include: an application name of the application that is registering as a listener; an address usable for communicating with that application (such as an address in shared storage where the application can retrieve event notifications; an Internet Protocol, or "IP", port number; etc.); and a name or description of the events in which this listener is interested.

In one approach, the listeners may use event filters (or similar criteria specifications, referred to herein as "filters" for ease of reference) when registering their interest, where these filters are used to provide the name or description of the events that are of interest to the listeners. These filters may be applied to selectively control which events are delivered to the registered listener. A simple event filter might specify, for example, that Application 1 400 wants to receive notifications of any e-mail messages that arrive at event sink 440. Or, the event filter might specify a more restricted interest, for example by specifying that the application wants to receive notifications of only those e-mail messages having particular keywords in the subject. More complex filters may be supported by an embodiment of the present invention, whereby a listener specifies that it is interested (for example) in receiving notification of messages having a particular security level or security attributes; messages having a particular priority level or importance level; and so forth. A filter may be used to specify that a particular client is interested in receiving notification of all system-generated messages, as another example. Or, a filter might specify that the listener only wants to be notified of a certain type of system-generated messages.

Figure 5:
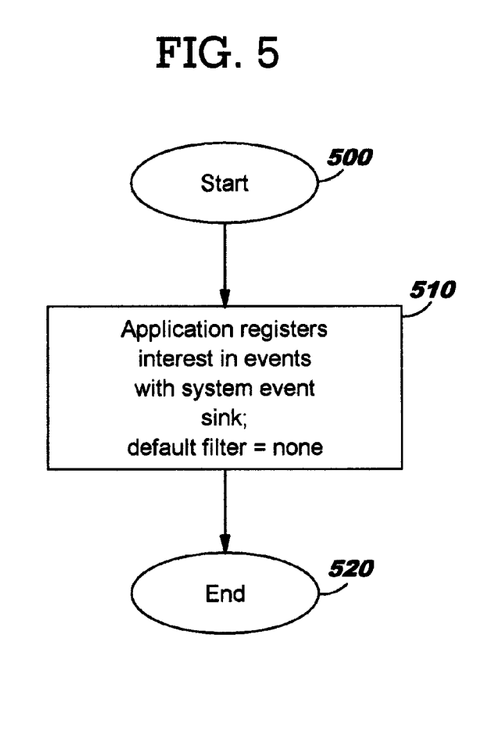
FIGS. 5 and 6 provide flowcharts depicting logic which may be used when implementing an embodiment of the present invention.
Figure 6:
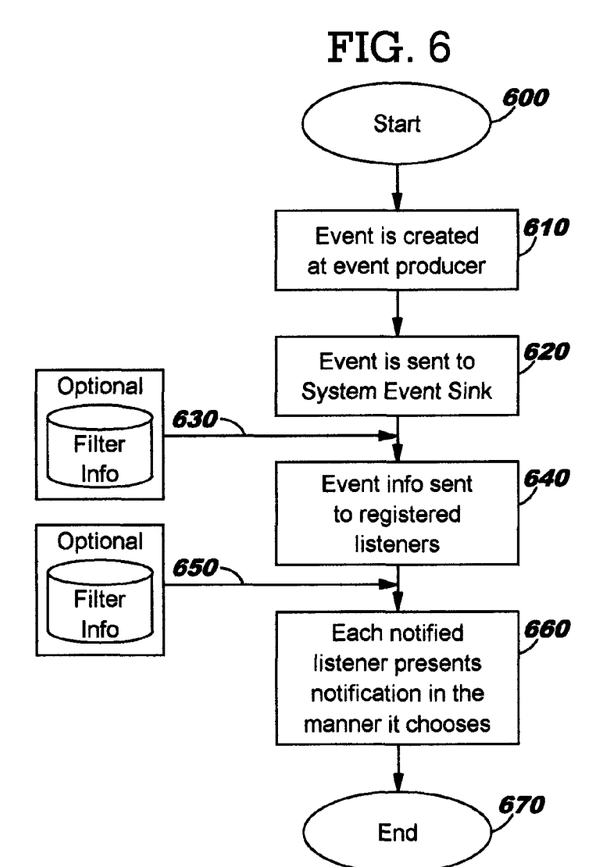

Turning now to FIGS. 5 and 6, flowcharts are provided that depict logic which may be used when implementing an embodiment of the present invention. FIG. 5 provides a registration flow, which is preferably triggered (at Block 500) when an application invokes the registration API. This particular application registers (Block 510) its interest in particular events. As discussed above, an application preferably invokes the registration API with parameter values that will be received at the event sink and then stored in a repository (illustrated at 442 in FIG. 4). Block 510 further indicates that an embodiment of the present invention may use a default filter. In one approach, this default filter is set so that no events of the type for which the application is registering as a listener are filtered out. Alternatively, a filter may be used that will exclude events, as has also been discussed above. Filtering of events is also discussed in more detail below with reference to FIG. 7 (and event filters associated with registered listeners may be stored in the registration information 442 or linked thereto).

The logic of Block 510 may be repeated for each type of event for which the registering application wishes to register as a listener. Or, the registration API may be created such that each listener invokes the API a single time and provides multiple filters, each describing a particular type of event for which this listener is interested. In any case, when the registration flow ends (Block 520), the listener's interests are thereby known to the event sink.

As will be obvious, some events may have multiple registered listeners while other events have a single registered listener (or perhaps no registered listeners).

FIG. 6 provides an event processing flow. This event processing flow is also preferably invoked using the API of the event sink (Block 600). An event producer produces an event (Block 610) and sends that event to the event sink (Block 620). For example, if the operating system detects that the battery of the computing device is running down, the operating system may generate a message and send a notification to the event sink. As another example, if an e-mail message arrives at this computing device from an e-mail server, the e-mail application may send a notification of the new e-mail message to the event sink.

Optionally, the event sink may store the notification received at Block 620 in an event queue (not shown in FIG. 6), such as event queue 441 of FIG. 4. Use of an event queue is discussed in more detail below.

The event sink may send a notification of the event received at Block 620 to each registered listener (Block 640); or, in another approach, an optional filtering process may be carried out, as shown by flow 630, whereby any applicable previously-created filters are applied to the event, and the notification is then sent to only those registered listeners for which the criteria in the applicable filter(s) are met.

Upon receiving the event notification at a registered listener, the notification may be presented for an end user (Block 660) in a manner selected by that registered listener; or, in another approach, an optional filtering process may be applied at the listener, as shown by flow 650, such that only event notifications meeting further filtering criteria are presented for the end user. (Refer to the discussion of FIG. 7, below, for more information on filtering of events.) The processing of FIG. 6 then ends (Block 670).

It may happen that more than one application registers as a listener for notification of a particular event. In such cases, the notification might be presented in an open window of each of these listening applications. Or, as another approach, an embodiment of the present invention may present the notification in windows of a subset of those listening applications. By way of example, the notification might be presented only in the open window that currently has the focus, or in a particular window specified by the end user in user preferences. As an example of a scenario that determines the window according to user preferences, suppose a particular user frequently interacts with a game application that is not well suited for presenting event notifications. In this case, the user might specify preferences indicating that event notifications should not be presented in the window of the game application. Or, the user might specify that event notifications having a particular security setting may be presented in the window of the game application, but that event notifications with other security settings should not be presented therein.

Figure 7:
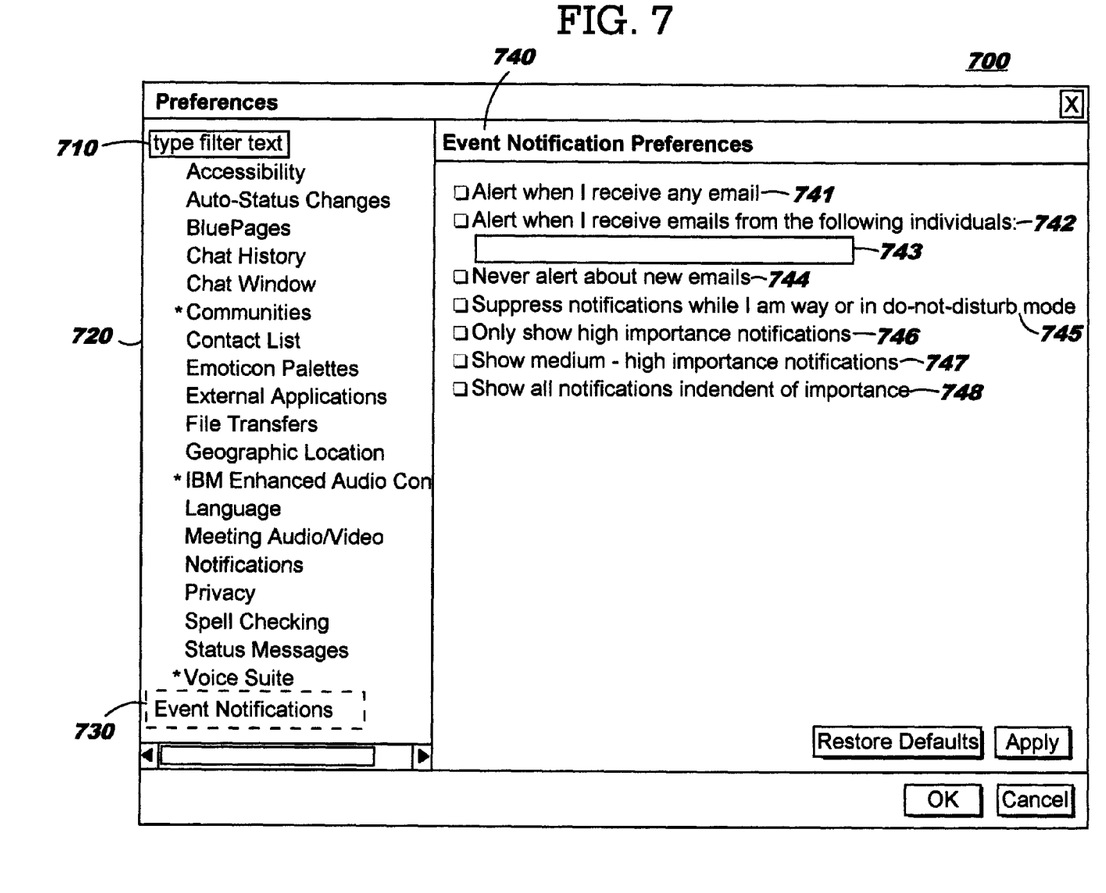
FIG. 7 illustrates a sample user interface that may be used with an embodiment of the present invention for an end user to set his preferences.

FIG. 7 illustrates a sample user interface 700 that may be used with an embodiment of the present invention for setting end user preferences. Preference setting for an embodiment of the present invention may be incorporated within a more general preference-setting application or utility, as shown by this example. Or, a user interface that is limited to preferences associated with event notifications might be used without deviating from the scope of the present invention. Sample user interface 700 is representative of the former approach. Accordingly, a pane 720 on the left-hand side of this user interface allows the user to select which type of preference information he wishes to provide. In this example, the "Event Notifications" choice 730 is highlighted (as shown in the figure by a dashed rectangle surrounding the text), indicating that the user has chosen this entry from pane 720. A text entry box 710 is shown for entering a name for this filter, and this may be provided as a convenience to the user (e.g., for subsequently recalling the stored preference information by name to edit information therein).

Responsive to selecting entry 730, a corresponding pane 740 is displayed on the right-hand side of the user interface 700. This pane 740 depicts several selectable options for filtering event notifications. These selections are provided by way of illustration only, and an embodiment of the present invention that supports use of preferences may provide additional or different choices.

Preference setting 741 can be chosen if the user wants to see an event notification for any incoming e-mail message. By contrast, setting 742 can be chosen if the user only wants to see an event notification upon receiving an e-mail message from a selected list of e-mail senders, and a text entry box is provided at 743 as one example of the manner in which those e-mail senders may be identified. As another choice, setting 744 can be selected if the user does not want to receive notifications of any incoming e-mail messages.

Setting 745 may be chosen if the user wants filtering of the event notifications to consider his current instant messaging state, and in this example, indicates that event notifications are to be suppressed while this state is "I am away" or "do not disturb".

Settings 746-748 pertain to an importance level of the event notification. Using setting 746, the user can select to only receive notifications of high importance, whereas setting 747 can be selected to receive notifications of medium to high importance, and setting 748 can be selected to receive notifications without regard to any importance level setting. (The manner in which such attributes are associated with an event notification may vary. As one example, event producers may set one or more flags in the event notification to indicate the importance level.)

Referring again to FIGS. 2 and 3, these examples illustrate displaying event notifications at the bottom of an IM chat window. These notifications may then scroll upward through the chat window as new instant messages are exchanged. As another approach, the event notifications might appear in a different part of the window provided by the IM client, such as in a scrolling window positioned beneath (or above) the chat window, or in an area commonly used for the buddy list, and so forth. A conventional user interface control may be used for rendering the event notifications.

Notifications that are presented using the IM window may be logged in a repository used to persist a history of the messages exchanged during an IM chat session. The notifications may be intermingled with the chat messages, according to the temporal ordering of receipt of the notification at the IM client; as another approach, the notification messages may be stored in an area of the repository that is separate from the exchanged chat messages. Optionally, an embodiment of the present invention enables an end user to select whether event notifications are persistently logged.

Event notifications may optionally include a time stamp. An embodiment of the present invention may optionally allow the end user to configure color, size, and/or other display attributes of event notifications.

As another option, event notifications may include clickable links that enable the end user to click the link from a displayed notification message to thereby open an appropriate application. For example, if the notification pertains to a newly-arrived e-mail message, the clickable link may be built by the event producer such that activating the link opens the user's e-mail client (or gives the e-mail client the current focus, if the client is already open), enabling the user to then interact with the e-mail client to view this new e-mail message.

Optionally, an event queue (such as event queue 441 of FIG. 4) may be used for storing event notifications received at the event sink, and this storing may occur following Block 620 of FIG. 6, as stated earlier. This event queue 441 may optionally be used for subsequent or additional processing of event notifications by an embodiment of the present invention. For example, if an event notification arrives for a registered listener which is not currently active, the event notification may remain in the event queue 441 until such time as it can be delivered to the listener. Optionally, an embodiment of the present invention may be adapted for storing event notifications in this queue 441 for a configurable maximum period of time, after which they are automatically purged. Or, in another approach, the event notifications remain in the event queue until they are consumed by at least one registered listener. When using a push model (which was discussed earlier), an embodiment of the present invention may periodically inspect the event queue to determine whether event notifications stored therein can be sent to a listener. When using a pull model (which was also discussed earlier), an embodiment of the present invention may inspect the event queue upon request of an application to determine whether any event notifications stored therein can be sent to this polling listener.

Storing the notifications in an event queue enables selectively postponing the presentation of a notification. For example, suppose the end user has selected to not receive any event notifications while his IM status is "do not disturb". Once the user's IM status changes to "active", event notifications from the event queue can then be processed for presentation to the user (assuming the notifications pass any other filters that may be defined).

Accessibility may be enhanced when using an embodiment of the present invention. For example, it is known in the art for sight-impaired users to configure their IM clients to use a screen reader. When using prior art techniques, event notifications from other applications or from the system itself might be missed by the screen reader if the notification appears when the screen reader is busy reading content that is displayed in the IM client. An embodiment of the present invention may avoid this undesirable result since the notifications can be placed directly in the IM client window where they can be read by the screen reader as it is processing the messages from the conventional message exchange.

Usability may also be enhanced when using an embodiment of the present invention, whereby the look and feel of a user's currently-active application is not disrupted to go to a completely separate window for viewing a notification of an incoming event (as in the prior art); instead, when using techniques disclosed herein, notification of the incoming event can be incorporated within the currently-active application and can therefore be presented using the same look and feel as the application itself (e.g., by using a user interface control or widget under control of the application).

The manner in which event producers structure their event notifications may vary without deviating from the scope of the present invention. In the case of an event notification produced in response to receiving an incoming e-mail message at an e-mail application, for example, the e-mail application preferably provides the text to be presented in the notification. The e-mail application, for example, may provide an identifier that represents this application (such as "Lotus Notes", displayed at 311 in FIG. 3), an identification of the message type and optionally an identifier of the sender of the e-mail message (such as "New e-mail from Tom Smith", displayed at 313 of FIG. 3), as well as a short summary of the subject of the e-mail message (as shown at 314 of FIG. 3). In one approach, this notification also contains a clickable link that can be activated to view the actual e-mail message itself. As another alternative, other mechanisms for associating an event notification with the underlying event may be used. In another approach, an event producer may provide all information associated with the underlying event as text of the event notification.

In addition to displaying an event notification in a window of a registered listener that is different from the application receiving the message, the operating system may also display the event notification in a conventional manner, if desired (but preferably does this in a manner that does not alter the current focus). Suppose a new e-mail message arrives but that there are no currently-active registered listeners for this event. In one approach, upon the event sink detecting that there are no active registered listeners, the operating system displays a bubble originating from an e-mail icon in the system tray that says "You have mail". At some later time, suppose the user starts an IM chat session, and this IM client registers its chat window as a listener for events from the event sink, including e-mail event notifications. If event notifications are held on a queue, a notification may be presented in the newly-opened chat window for this earlier-received e-mail message. Further suppose that another e-mail message is received after the IM client is registered as a listener. In that case, seeing that there is a registered listener for the event sink, the operating system sends the event notification to the event sink. Using either a push model or a pull model, as applicable, the IM client sees the event notification and displays it in the active chat window (i.e., the chat window having the current focus).

Alternatives to using an IM chat window for presenting event notifications include using a video player, where the notification may be displayed in closed captioning; using an audio player, where the notification may be played audibly (as speech created using a text-to-speech generator) over the current audio track; using a GMail™ webmail service or Google Reader™ feed reader, where the notification may be displayed as an update in the feed reading section; using a gaming application, where the notification flies across the screen as a text message; using a file system store, where the notification may be persisted in a permanent history of system events; and so forth. These examples of applications and styles of notification are provided by way of illustration but not of limitation. ("GMail" and "Google Reader" are trademarks of Google Inc. in the United States, other countries, or both.)

An embodiment of the present invention may be provided as a plug-in that listens for events from an application or system and sends event notifications to the event sink, and/or a plug-in that listens for events from the event sink and presents those notifications in a window. An embodiment of the present invention may be used with a legacy client application, for example by providing code that traps message dialogs from that client application before they are presented, translates those dialogs into a form usable by an application (such as an IM client) other than the legacy application that would conventionally receive and display the message, and then presents the translated form to the corresponding application (e.g., to the IM client) for displaying.

While discussions herein are primarily in terms of an event sink residing on an end user computing device and processing events at that computing device, in another approach, the system event sink operates at a centralized location or network-accessible location such as a server that is communicatively coupled to applications executing on a client device. Optionally, the centrally-located event sink (which may alternatively be referred to as a network-accessible event sink) may concurrently interact with applications executing on multiple client devices. The manner in which applications interact with the centrally-located event sink is preferably analogous to that which has been described above for the event sink residing on an end user computing device.

Figure 8:
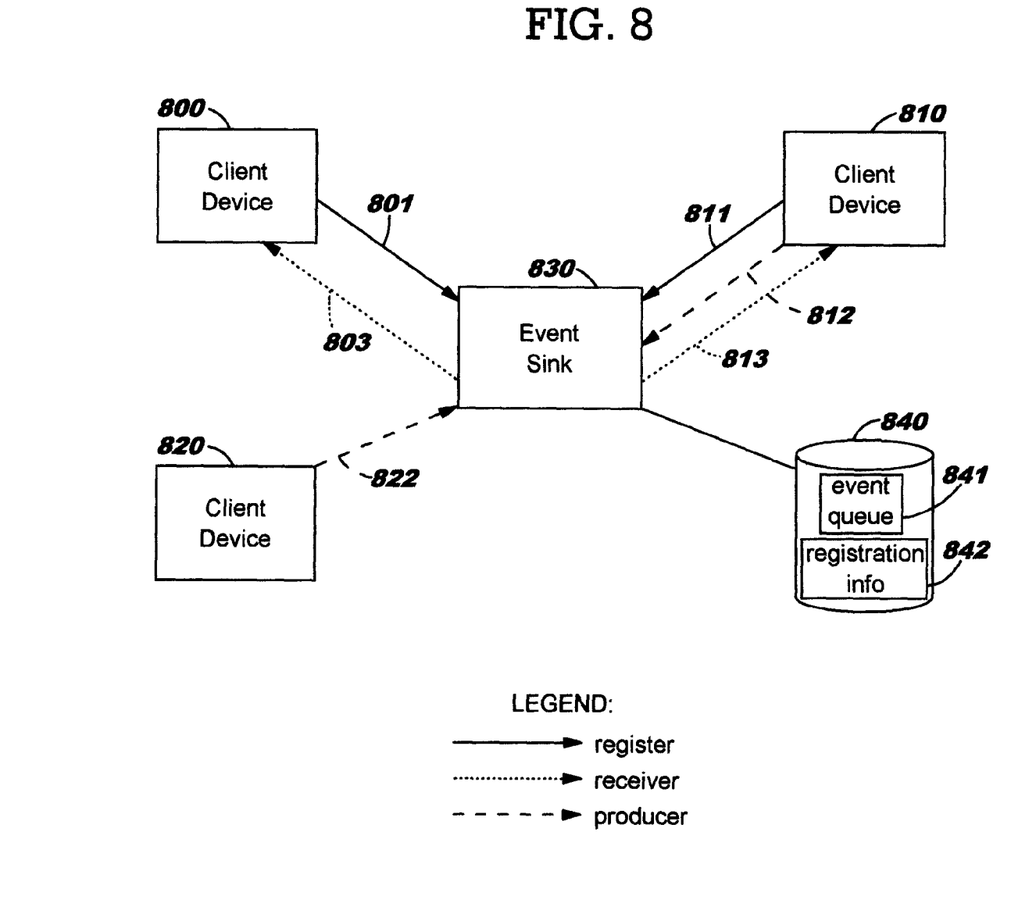
FIG. 8 depicts components that may be present in a sample configuration of an alternative embodiment of the present invention.

See FIG. 8, depicting components that may be used in a sample configuration of an embodiment of the present invention when using this alternative approach. As shown therein, an event sink 830 is communicatively coupled (for example, using a public network such as the Internet) to applications executing on client devices 800, 810, 820. Applications executing on client devices 800 and 810 are shown, in this sample configuration, as registering their interest in particular events with the event sink 830. See registration message flows 801, 811. Preferably, each application registering as a listener provides an address, such as an IP address and port number, to which the event sink 830 will route notification messages to that listener.

Applications executing on client devices 810, 820 are shown, in this sample configuration, as event producers. Message flows 812, 822 represent messages sent from each of these applications to the event sink 830. For example, an e-mail application might be executing at client device 820, and might send message 822 responsive to detecting a new e-mail message for delivery to a user. Applications at client devices 800, 810 are shown, in this sample configuration, as event receivers. See message flows 803, 813.

FIG. 8 also illustrates a storage repository 840 that is accessible to the event sink 830. In this sample configuration, repository 840 is depicted as storing an event queue 841 and registration information 842 that pertains to the registered listeners. These components preferably operate in an analogous manner to event queue 441 and registration information 442 of FIG. 4, which were described above.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 9:
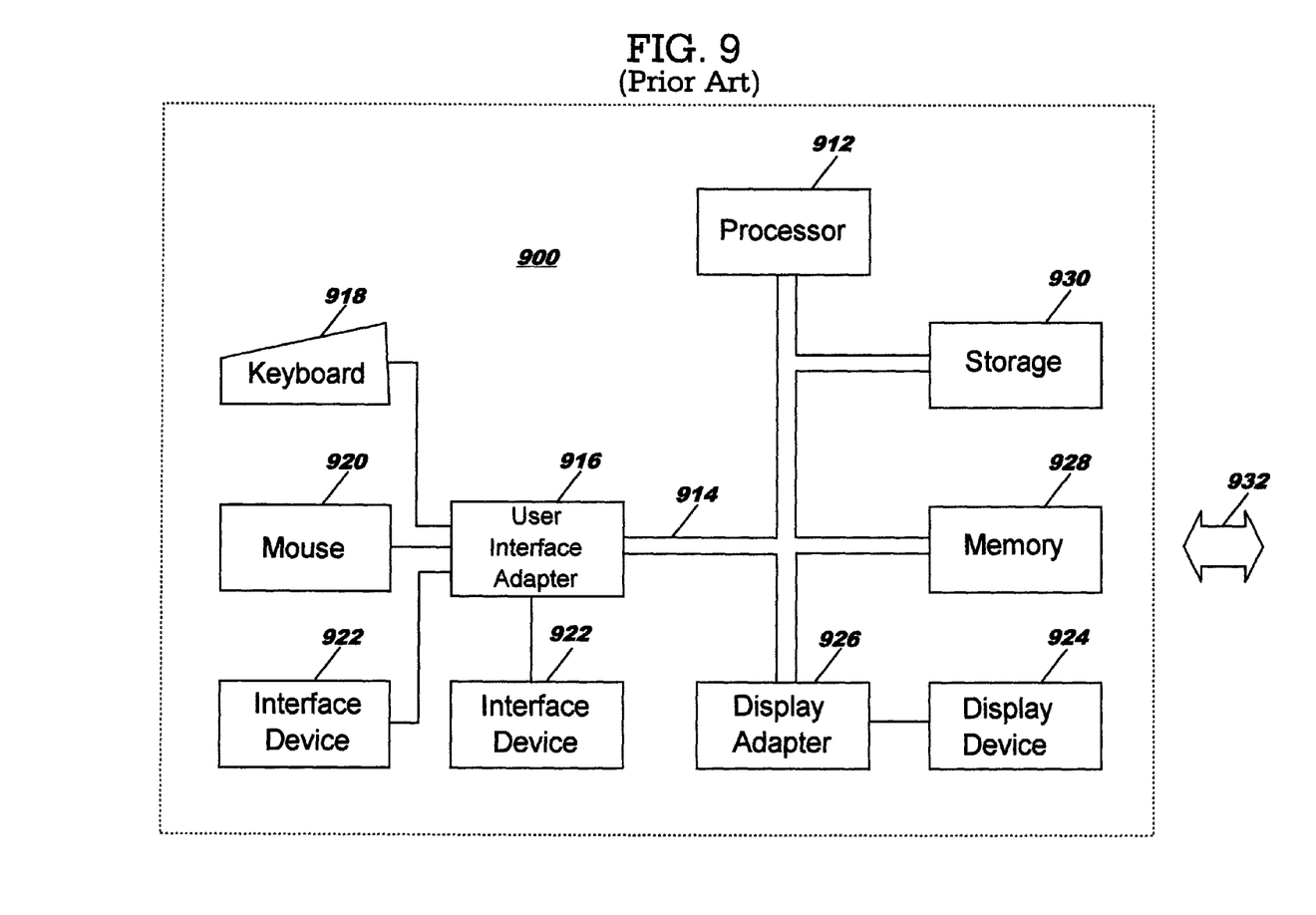
FIG. 9 depicts a data processing system suitable for storing and/or executing program code.

Referring now to FIG. 9, a data processing system 900 suitable for storing and/or executing program code includes at least one processor 912 coupled directly or indirectly to memory elements through a system bus 914. The memory elements can include local memory 928 employed during actual execution of the program code, bulk storage 930, and cache memories (not shown) which provide temporary storage of at least some program code in order to reduce the number of times code must be retrieved from bulk storage during execution.

Input/output ("I/O") devices (including but not limited to keyboards 918, displays 924, pointing devices 920, other interface devices 922, etc.) can be coupled to the system either directly or through intervening I/O controllers or adapters (916, 926).

Network adapters may also be coupled to the system to enable the data processing system to become coupled to other data processing systems or remote printers or storage devices through intervening private or public networks (as shown generally at 932). Modems, cable modem attachments, wireless adapters, and Ethernet cards are just a few of the currently-available types of network adapters.

Figure 10:
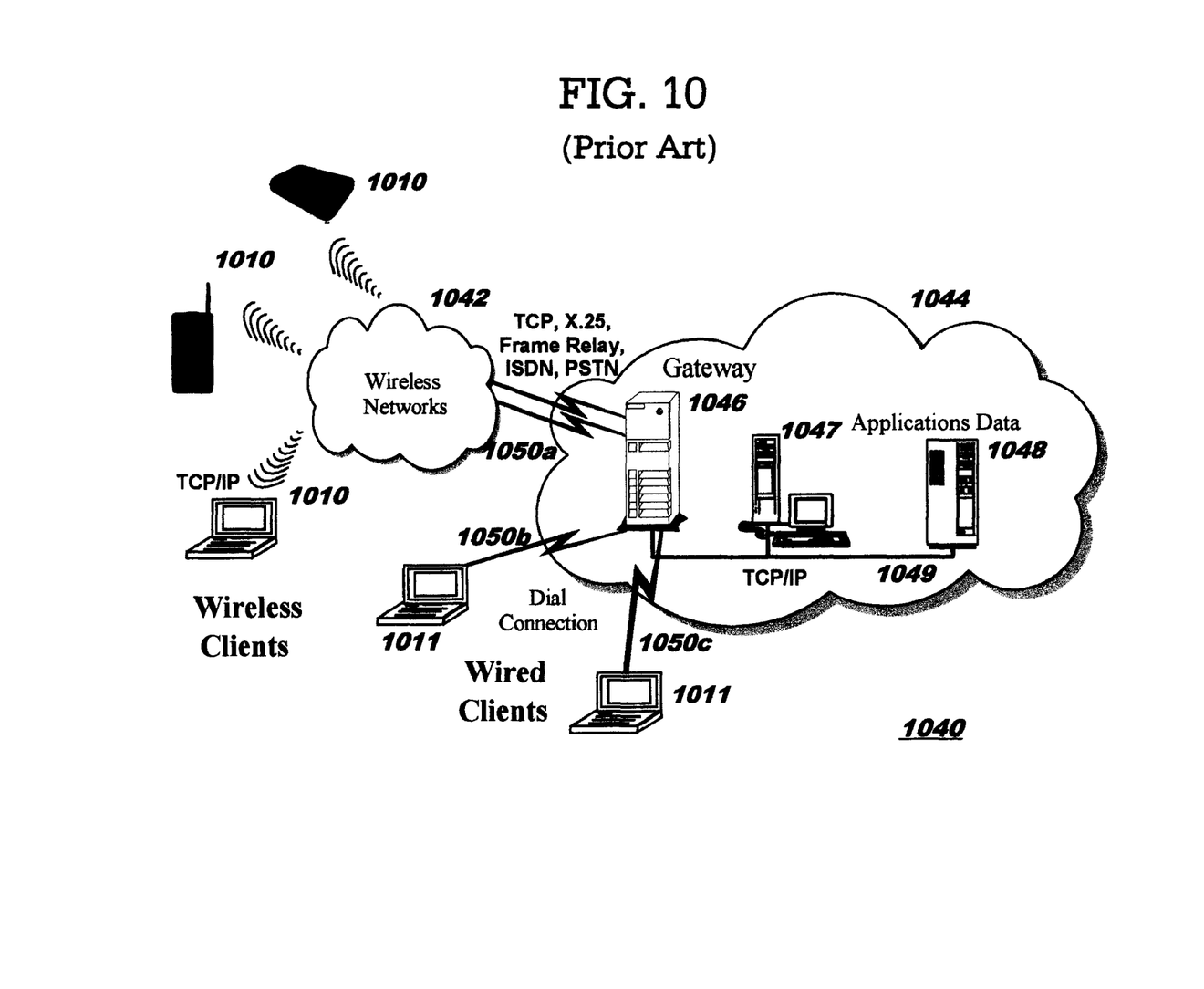
FIG. 10 depicts a representative networking environment in which one or more embodiments of the present invention may be used.

FIG. 10 illustrates a data processing network environment 1000 in which the present invention may be practiced. The data processing network 1000 may include a plurality of individual networks, such as wireless network 1042 and network 1044. A plurality of wireless devices 1010 may communicate over wireless network 1042, and a plurality of wired devices, shown in the figure (by way of illustration) as workstations 1011, may communicate over network 1044. Additionally, as those skilled in the art will appreciate, one or more local area networks ("LANs") may be included (not shown), where a LAN may comprise a plurality of devices coupled to a host processor.

Still referring to FIG. 10, the networks 1042 and 1044 may also include mainframe computers or servers, such as a gateway computer 1046 or application server 1047 (which may access a data repository 1048). A gateway computer 1046 serves as a point of entry into each network, such as network 1044. The gateway 1046 may be preferably coupled to another network 1042 by means of a communications link 1050a. The gateway 1046 may also be directly coupled to one or more workstations 1011 using a communications link 1050b, 1050c, and/or may be indirectly coupled to such devices. The gateway computer 1046 may be implemented utilizing an Enterprise Systems Architecture/390® computer available from IBM. Depending on the application, a midrange computer, such as an Application System/400® (also known as an AS/400®) may be employed. ("Enterprise Systems Architecture/390", "Application System/400", and "AS/400" are registered trademarks of IBM in the United States, other countries, or both.)

The gateway computer 1046 may also be coupled 1049 to a storage device (such as data repository 1048).

Those skilled in the art will appreciate that the gateway computer 1046 may be located a great geographic distance from the network 1042, and similarly, the wireless devices 1010 and/or workstations 1011 may be located some distance from the networks 1042 and 1044, respectively. For example, the network 1042 may be located in California, while the gateway 1046 may be located in Texas, and one or more of the workstations 1011 may be located in Florida. The wireless devices 1010 may connect to the wireless network 1042 using a networking protocol such as the Transmission Control Protocol/Internet Protocol ("TCP/IP") over a number of alternative connection media, such as cellular phone, radio frequency networks, satellite networks, etc. The wireless network 1042 preferably connects to the gateway 1046 using a network connection 1050a such as TCP or User Datagram Protocol ("UDP") over IP, X.25, Frame Relay, Integrated Services Digital Network ("ISDN"), Public Switched Telephone Network ("PSTN"), etc. The workstations 1011 may connect directly to the gateway 1046 using dial connections 1050b or 1050c. Further, the wireless network 1042 and network 1044 may connect to one or more other networks (not shown), in an analogous manner to that depicted in FIG. 10.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of processing event notifications, comprising:
receiving, at a client device by an executing application that registered interest in receiving at least one event notification, the event notification, wherein the event notification pertains to a message or a status of a different application operable on the client device or of an operating system of the client device, the event notification produced by the different application or the operating system responsive to the message or the status and sent by the producer to an event sink with which the receiving application registered the interest and from which the event notification is received by the receiving application; and rendering the received event notification by the receiving application instead of, or in addition to, rendering the message or the status by a rendering mechanism of the producer of the received event notification, wherein:
the receiving application is an instant messaging application;
the different application is an email application;
the notification indicates that the different application received an inbound email message; and
the rendering comprises visually displaying the received event notification in a currently-active chat window of the instant messaging application to indicate that the different application received the inbound email message.

2. The method according to claim 1, wherein the rendering of the received event notification by the receiving application enables current focus to remain in a window of the receiving application in which the rendering occurs.

3. The method according to claim 1, wherein the rendering comprises visually displaying the received event notification in a currently-active user interface window of the receiving application.

4. The method according to claim 1, wherein the rendering further comprises visually displaying the received event notification in each currently-open user interface window of the client device on which the receiving application is executing.

5. The method according to claim 1, wherein the rendering is suppressed if a current instant messaging status of the instant messaging application is other than active.

6. The method according to claim 1, wherein preferences of a user of the executing application control the rendering of the received event notification.

7. The method according to claim 1, further comprising:
providing a selectable link on the rendered event notification rendered by the receiving application; and
opening the message in a window of the producer of the received event notification responsive to activation of the selectable link.

8. A computer-implemented system for processing event notifications, comprising:
a computer comprising a processor; and
instructions which execute, using the processor, to implement functions comprising:
receiving, at a client device by an executing application that registered interest in receiving at least one event notification, the event notification, wherein the event notification pertains to a message or a status of a different application operable on the client device or of an operating system of the client device, the event notification produced by the different application or the operating system responsive to the message or the status and sent by the producer to an event sink with which the receiving application registered the interest and from which the event notification is received by the receiving application; and
rendering the received event notification by the receiving application instead of, or in addition to, rendering the message or the status by a rendering mechanism of the producer of the received event notification, wherein:
the receiving application is an instant messaging application;
the different application is an email application;
the notification indicates that the different application received an inbound email message; and
the rendering comprises visually displaying the received event notification in a currently-active chat window of the instant messaging application to indicate that the different application received the inbound email message.

9. A computer program product for processing event notifications, the computer program product embodied on at least one computer-usable non-transitory storage medium and comprising computer-usable program code for:
receiving, at a client device by an executing application that registered interest in receiving at least one event notification, the event notification, wherein the event notification pertains to a message or a status of a different application operable on the client device or of an operating system of the client device, the event notification produced by the different application or the operating system responsive to the message or the status and sent by the producer to an event sink with which the receiving application registered the interest and from which the event notification is received by the receiving application; and
rendering the received event notification by the receiving application instead of, or in addition to, rendering the message or the status by a rendering mechanism of the producer of the received event notification, wherein:
the receiving application is an instant messaging application;
the different application is an email application;
the notification indicates that the different application received an inbound email message; and
the rendering comprises visually displaying the received event notification in a currently-active chat window of the instant messaging application to indicate that the different application received the inbound email message.

10. A system for processing event notifications, comprising:
means for receiving, at a client device by an executing application that registered interest in receiving at least one event notification, the event notification, wherein the event notification pertains to a message or a status of a different application operable on the client device or of an operating system of the client device, the event notification produced by the different application or the operating system responsive to the message or the status and sent by the producer to an event sink with which the receiving application registered the interest and from which the event notification is received by the receiving application; and
means for rendering the received event notification by the receiving application instead of, or in addition to, rendering the message or the status by a rendering mechanism of the producer of the received event notification, wherein:
the receiving application is an instant messaging application;

the different application is an email application;
the notification indicates that the different application received an inbound email message; and
the rendering comprises visually displaying the received event notification in a currently-active chat window of the instant messaging application to indicate that the different application received the inbound email message.

* * * * *